(12) United States Patent
Ibrahim et al.

(10) Patent No.: US 10,511,363 B2
(45) Date of Patent: Dec. 17, 2019

(54) PRECODING FOR ADVANCED WIRELESS COMMUNICATION SYSTEMS

(71) Applicant: Samsung Electronics Co., Ltd., Suwon-si, Gyeonggi-do (KR)

(72) Inventors: Ahmed Ibrahim, Richardson, TX (US); Young-Han Nam, Plano, TX (US); Yeqing Hu, Garland, TX (US); Eun Yong Kim, Suwon-si (KR); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/256,898

(22) Filed: Jan. 24, 2019

(65) Prior Publication Data
US 2019/0341978 A1    Nov. 7, 2019

Related U.S. Application Data

(60) Provisional application No. 62/667,148, filed on May 4, 2018.

(51) Int. Cl.
*H04B 7/04* (2017.01)
*H04B 7/0456* (2017.01)
(Continued)

(52) U.S. Cl.
CPC ........... *H04B 7/0456* (2013.01); *H04B 7/061* (2013.01); *H04B 7/0626* (2013.01);
(Continued)

(58) Field of Classification Search
CPC .. H04B 7/0456; H04B 7/0626; H04B 17/309; H04B 7/061; H04B 7/0639; H04B 7/043
See application file for complete search history.

(56) References Cited

U.S. PATENT DOCUMENTS

2011/0188549 A1* 8/2011 Wan ..................... H04B 7/0615
375/213
2012/0320874 A1    12/2012 Li et al.
(Continued)

OTHER PUBLICATIONS

Vasisht et al., "Eliminating Channel Feedback in Next-Generation Cellular Networks," Proceedings of the 2016 ACM SIGCOMM Conference (SIGCOMM '16), Aug. 2016, pp. 398-411.
(Continued)

*Primary Examiner* — Jean B Corrielus

(57) ABSTRACT

Base station (BS) capable of beamforming in a wireless communication includes a transceiver comprising an antenna array, the transceiver configured to measure SRS from a UE, using at least one portion of the antenna array, and a processor configured to select at least one UL beam vector based on an SRS measurement from a UL beam-codebook comprising a set of beam weight vectors, determine at least one DL beam weight vector corresponding to each of the selected at least one UL beam weight vector, transmit a beamformed CSI-RS by applying the at least one DL beam weight vector to the antenna array, receive a CSI feedback including a PMI from the UE, wherein the PMI is determined based on the beamformed CSI-RS, and construct a precoding channel matrix for the UE based on the PMI and the at least one DL beam weight vector.

20 Claims, 7 Drawing Sheets

(51) Int. Cl.
*H04B 7/06* (2006.01)
*H04B 17/309* (2015.01)
*H04B 7/0426* (2017.01)

(52) U.S. Cl.
CPC ......... *H04B 7/0639* (2013.01); *H04B 17/309* (2015.01); *H04B 7/043* (2013.01)

(56) References Cited

U.S. PATENT DOCUMENTS

| | | | |
|---|---|---|---|
| 2016/0254893 A1* | 9/2016 | Yang | H04L 5/0051 370/329 |
| 2017/0047975 A1 | 2/2017 | Lee et al. | |
| 2017/0237478 A1 | 8/2017 | Kwak et al. | |
| 2019/0190569 A1* | 6/2019 | Nayeb Nazar | H04B 7/0417 |

OTHER PUBLICATIONS

ISA/KR, International Search Report and Written Opinion of the International Searching Authority, International Application No. PCT/KR2019/005358, dated Aug. 13, 2019, 8 pages.

NTT DOCOMO, "CSI Feedback Type I for NR MIMO," R1-1708456, 3GPP TSG RAN WG1 Meeting #89, Hangzhou, China, May 15-19, 2017, 15 pages.

ZTE, "On reciprocity based CSI acquisition," R1-1707125, 3GPP TSG RAN WG1 Meeting #89, Hangzhou, China, May 15-19, 2017, 7 pages.

* cited by examiner

PRECODING FOR ADVANCED WIRELESS COMMUNICATION SYSTEMS

CROSS-REFERENCE TO RELATED APPLICATION AND CLAIMS OF PRIORITY

This application claims priority under 35 U.S.C. § 119(e) to: U.S. Provisional Patent Application No. 62/667,148 filed on May 4, 2018. The above-identified provisional patent application is hereby incorporated by reference in their entirety.

TECHNICAL FIELD

The present disclosure relates generally to a codebook design and structure associated with a two dimensional transmit antenna array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to a pre-5th-Generation (5G) or 5G communication system to be provided for supporting higher data rates beyond 4th-Generation (4G) communication system such as Long Term Evolution (LTE).

In a first embodiment, a base station (BS) capable of beamforming in a wireless communication is provided. The BS includes a transceiver comprising an antenna array, the transceiver configured to measure a sound reference signal (SRS) from a user equipment (UE), using at least one portion of the antenna array, and at least one processor configured to select at least one uplink (UL) beam vector based on an SRS measurement from a UL beam-codebook comprising a set of beam weight vectors, determine at least one downlink (DL) beam weight vector corresponding to each of the selected at least one UL beam weight vector, transmit a beamformed channel state information (CSI)-reference signal (RS) by applying the at least one DL beam weight vector to the antenna array, receive a CSI feedback including a Precoding Matrix Index (PMI) from the UE, wherein the PMI is determined based on the beamformed CSI-RS, and construct a precoding channel matrix for the UE based on the PMI and the at least one DL beam weight vector.

In a second aspect, a method for beamforming in a base station (BS) is provided. The method includes measuring a sound reference signal (SRS) from a user equipment (UE), using at least one portion of an antenna array, selecting at least one uplink (UL) beam vector based on an SRS measurement from a UL beam-codebook comprising a set of beam weight vectors, determining at least one downlink (DL) beam weight vector corresponding to each of the selected at least one UL beam weight vector, transmitting a beamformed channel state information (CSI)-reference signal (RS) by applying the at least one DL beam weight vector to the antenna array, receiving a CSI feedback including a Precoding Matrix Index (PMI) from the UE, wherein the PMI is determined based on the beamformed CSI-RS, and constructing a precoding channel matrix for the UE, based on the PMI and the at least one DL beam weight vector.

In a third aspect, a non-transitory computer-readable medium comprising program code for beamforming in a wireless communication in a base station (BS) is provided. The program code that, when executed by a processor, causes the processor to measure a sound reference signal (SRS) from a user equipment (UE), using at least one portion of an antenna array, select at least one uplink (UL) beam vector based on an SRS measurement from a UL beam-codebook comprising a set of beam weight vectors, determine at least one downlink (DL) beam weight vector corresponding to each of the selected at least one UL beam weight vector, transmit a beamformed channel state information (CSI)-reference symbol (RS) by applying the at least one DL beam weight vector to the antenna array, receive a CSI feedback including a Precoding Matrix Index (PMI) from the UE, wherein the PMI is determined based on the beamformed CSI-RS, and construct a precoding channel matrix for the UE, based on the PMI and the at least one DL beam weight vector.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

Figure 1:
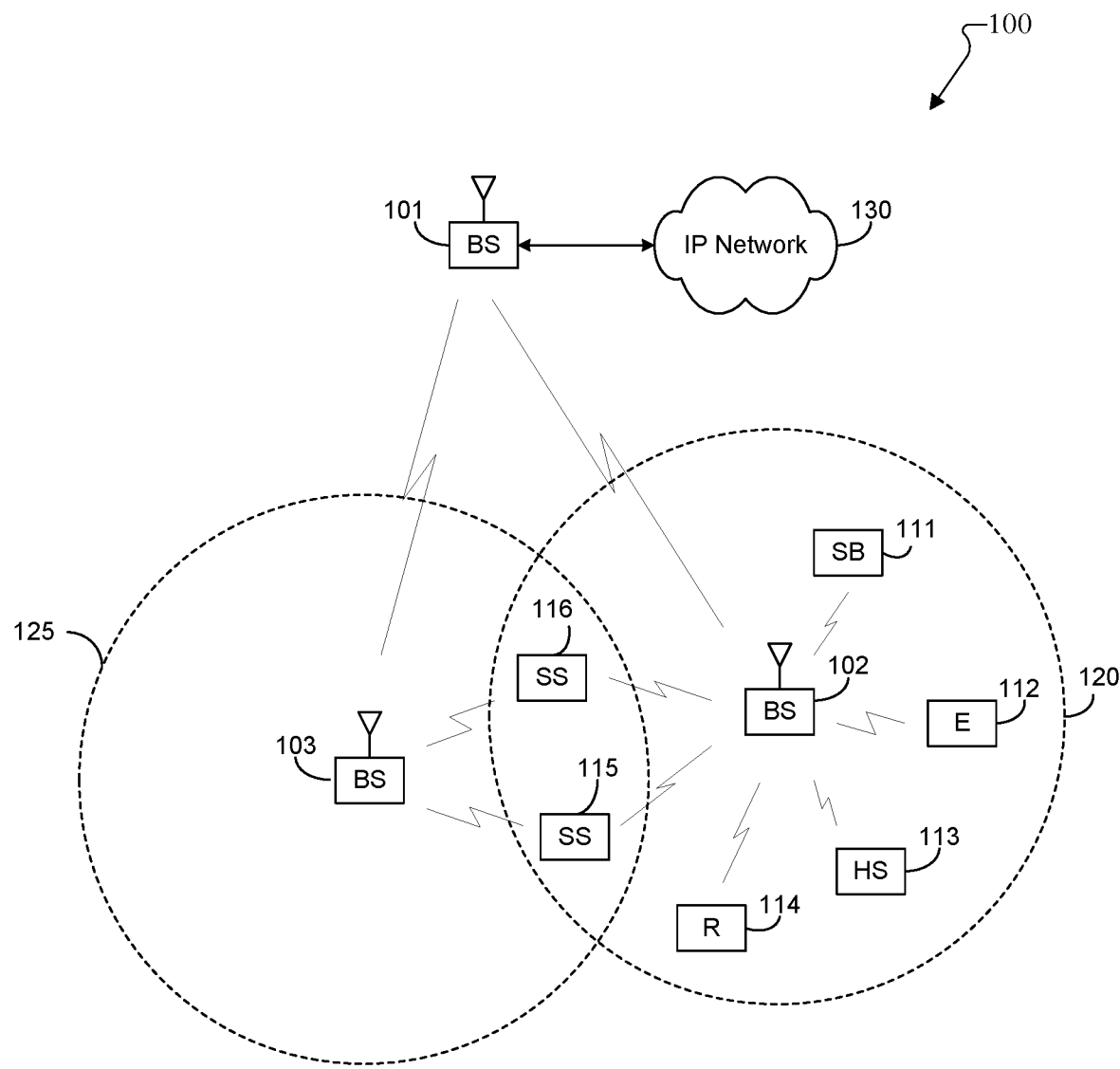
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
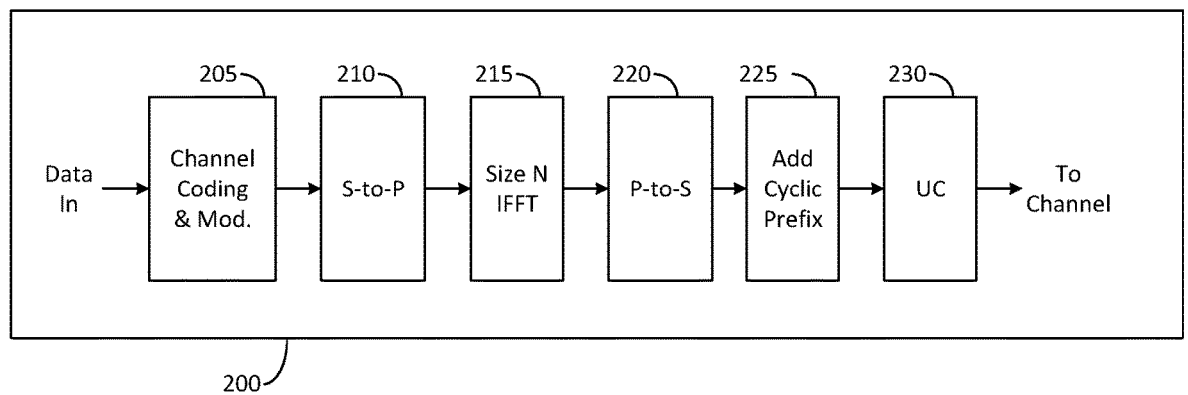
FIGS. 2A and 2B illustrate example wireless transmit and receive paths according to this disclosure.
Figure 2B:
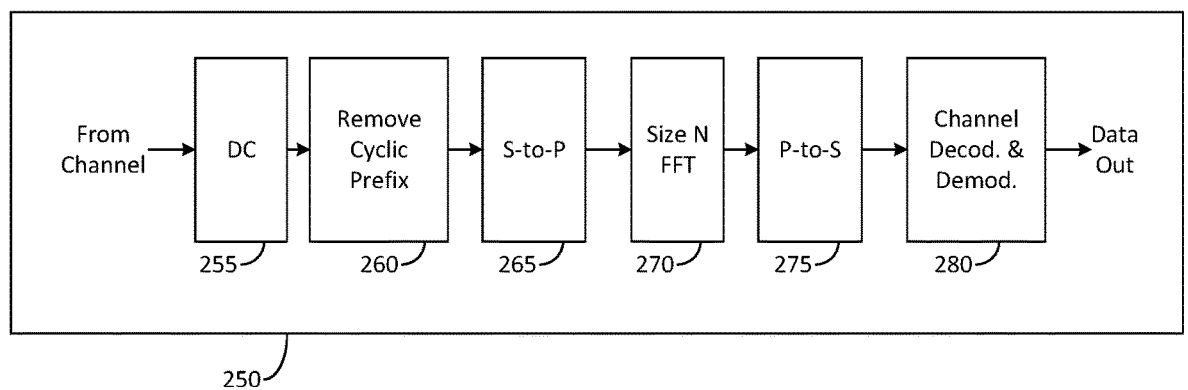

FIGS. 2A and 2B illustrate example wireless transmit and receive paths according to this disclosure. In the following description, a transmit path 200 may be described as being implemented in an gNB (such as gNB 102), while a receive path 250 may be described as being implemented in a UE (such as UE 116). However, it will be understood that the receive path 250 could be implemented in an gNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal.

The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
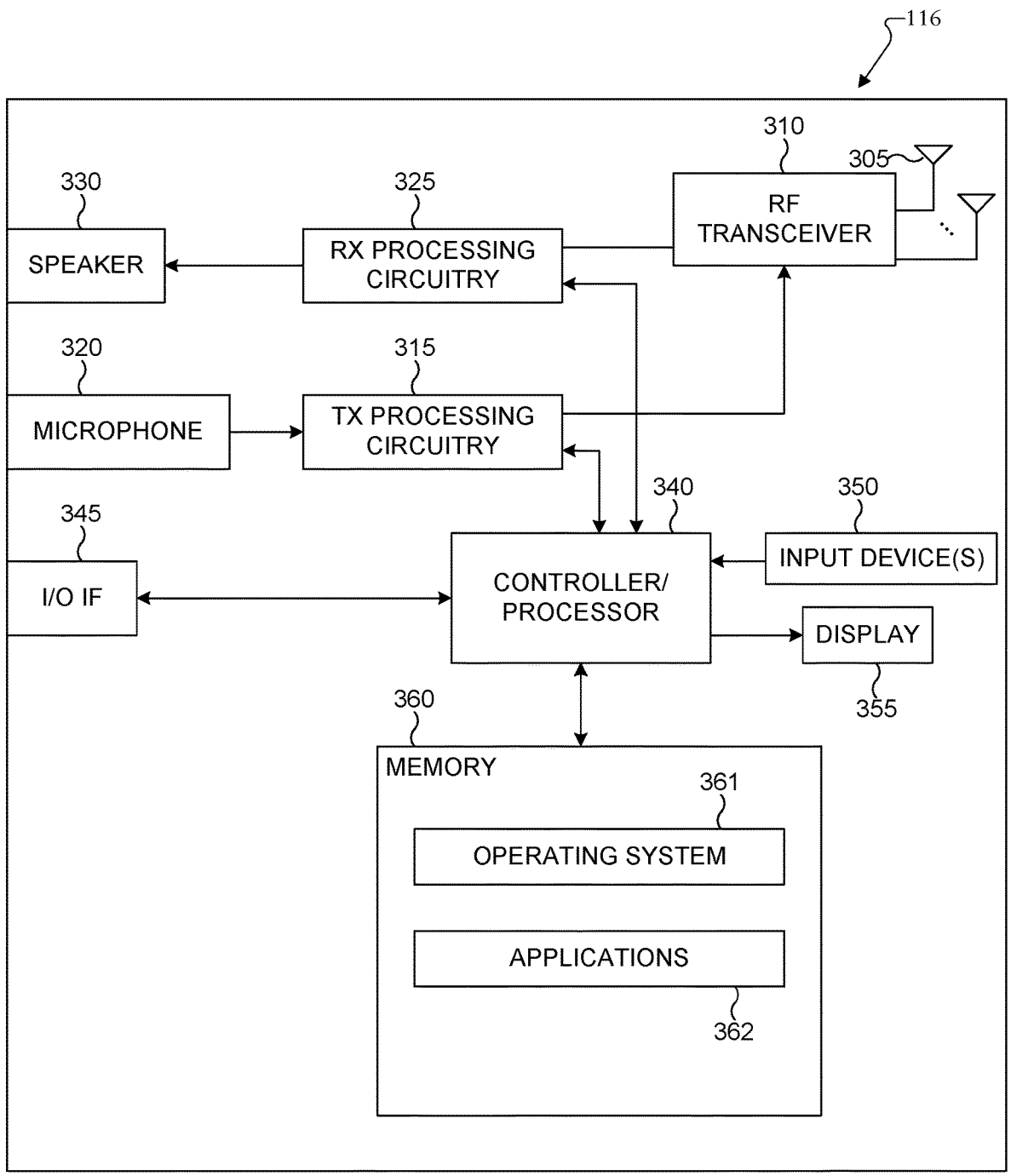
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
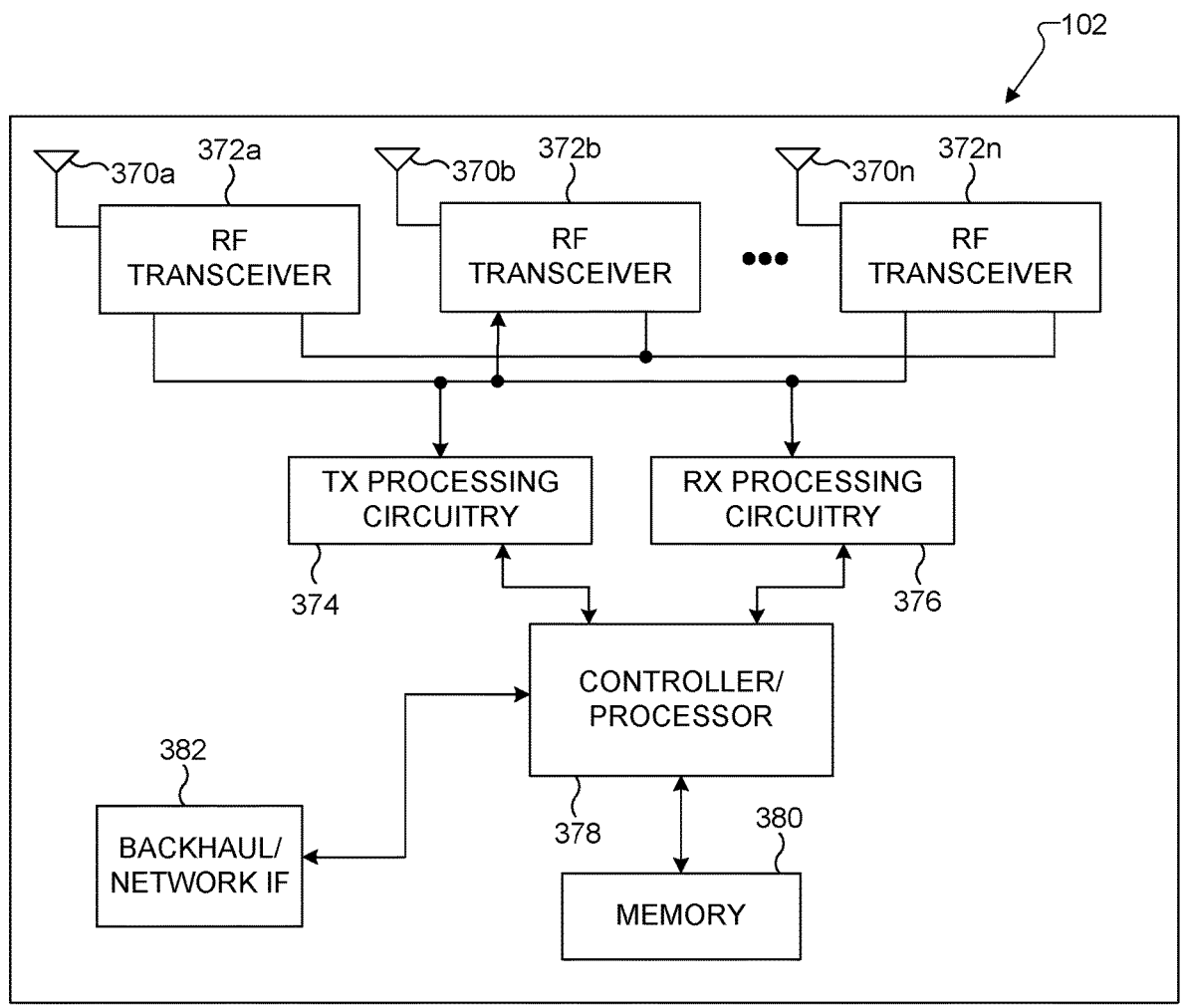
FIG. 3B illustrates an example general NodeB (gNB) according to this disclosure.

FIG. 3B illustrates an example gNB 102 according to this disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of this disclosure to any particular implementation of an gNB. It is noted that gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate a processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of an gNB 102, various changes may be made to FIG. 3B. For example, the gNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Figure 4:
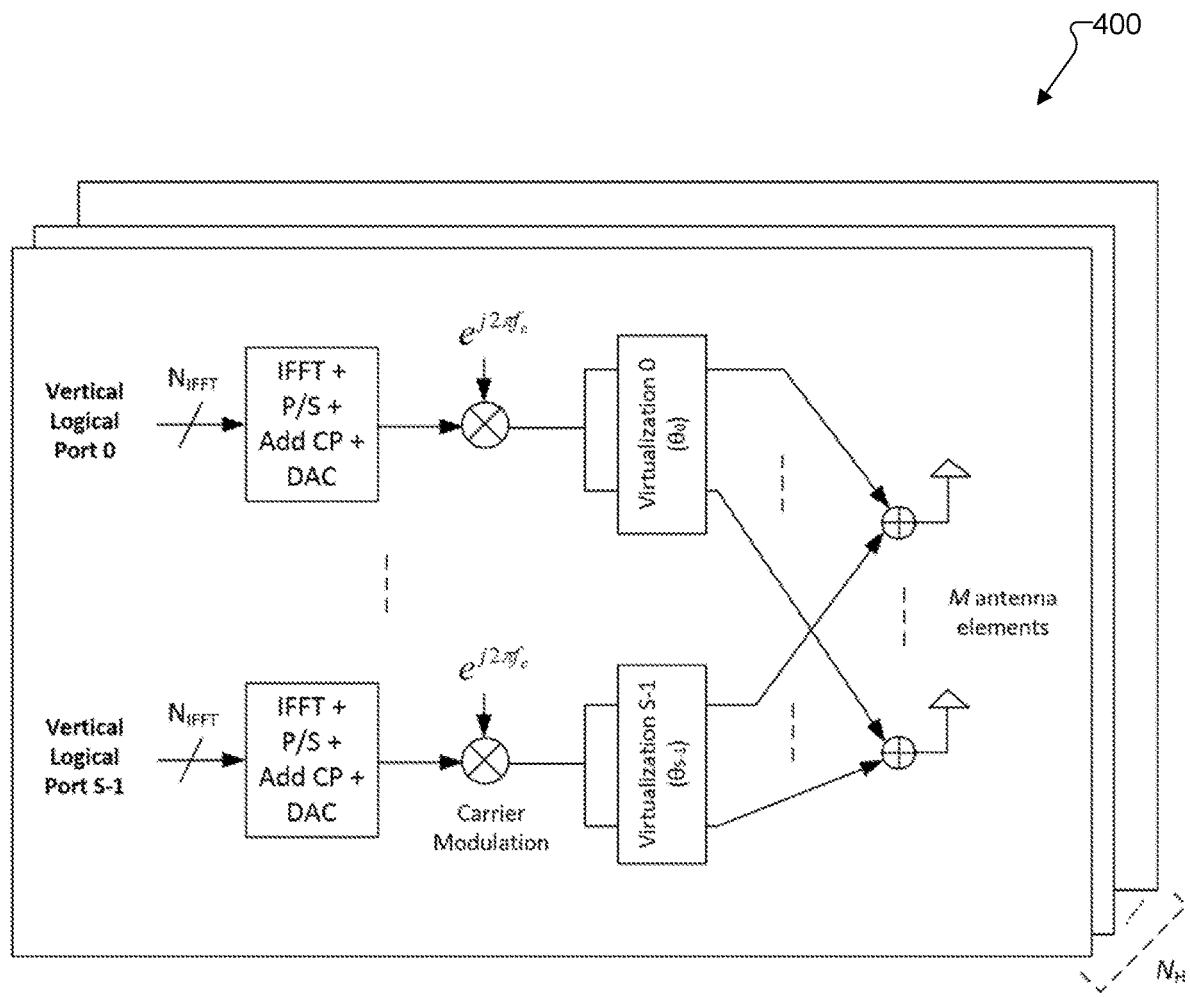
FIG. 4 illustrates an exemplary logical port to antenna port mapping that may be employed within the wireless communication system according to some embodiments of the current disclosure.

FIG. 4 illustrates logical port to antenna port mapping 400, according to some embodiments of the current disclosure. In the figure, Tx signals on each logical port is fed into an antenna virtualization matrix (e.g., of a size M×1), output signals of which are fed into a set of M physical antenna ports. In some embodiments, M corresponds to a total number or quantity of antenna elements on a substantially vertical axis. In some embodiments, M corresponds to a ratio of a total number or quantity of antenna elements to S, on a substantially vertical axis, wherein M and S are chosen to be a positive integer.

Figure 5:
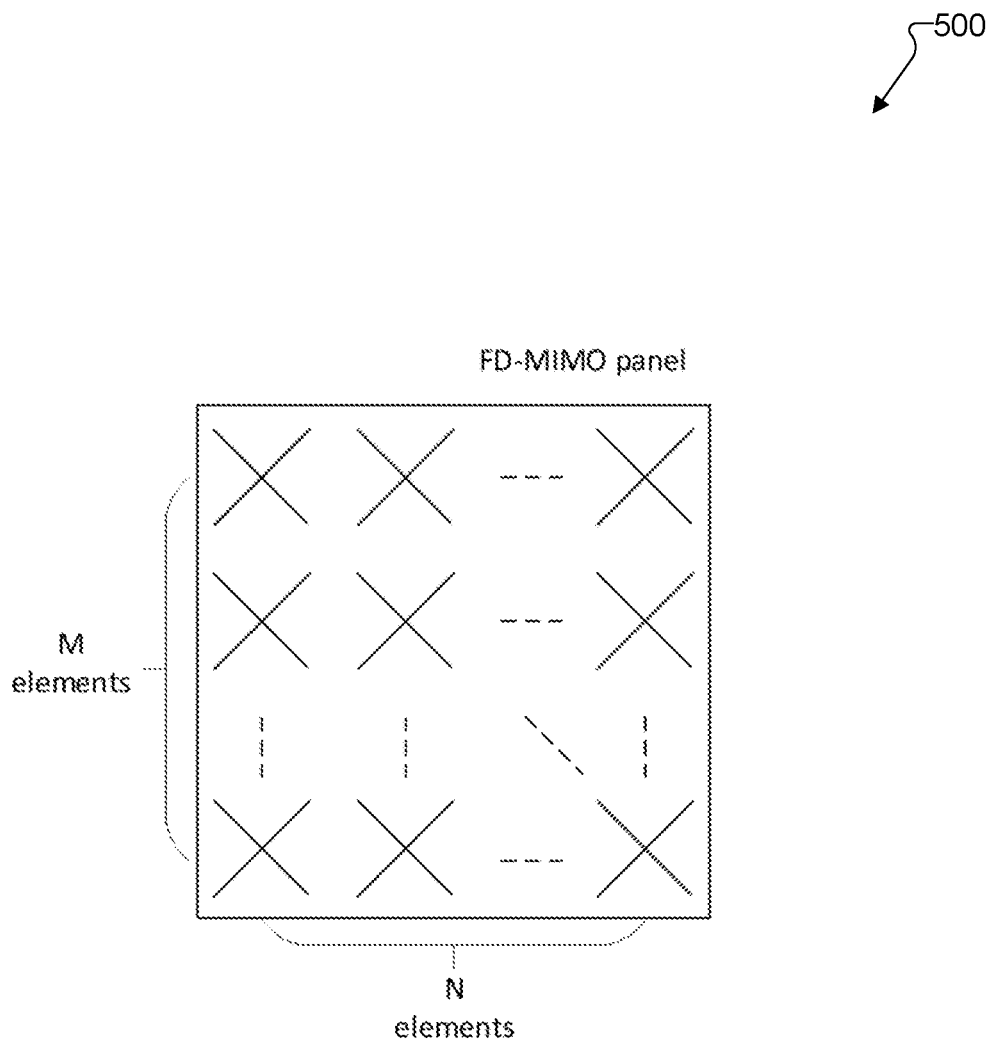
FIG. 5 illustrates an exemplary full-dimensional (FD) multiple input, multiple output (MIMO) or massive MIMO antenna array according to one embodiment of the present disclosure.

FIG. 5 illustrates an exemplary full-dimensional (FD) multiple input, multiple output (MIMO) or massive MIMO antenna array according to one embodiment of the present disclosure. The embodiment shown in FIG. 5 is for illustration only. Other embodiments could be used without departing from the scope of the present disclosure.

As illustrated, the MIMO antenna array includes X-pol antenna element pairs comprising M rows and N columns of X-pol element pair. Each X-pol element pair comprises two antennas polarized into two directions, e.g., +45 degs and −45 degs.

In certain embodiments, gNB is equipped with 2D rectangular antenna array comprising M rows and N columns with P=2 polarized, wherein each element is indexed with $(m, n, p)$, and $m=0, \ldots, M-1, n=0, \ldots, N-1, p=0, \ldots, P-1$. In one example (1-dimensional (1D) subarray partition), an antenna array comprising a column with a same polarization of a 2D rectangular array is partitioned into M groups of consecutive elements, and the M groups correspond to the M transceivers (TXRUs) in a column with a same polarization in the TXRU array in FIG. 5. In later embodiments, (M,N) is sometimes denoted as $(N_H, N_V)$ or $(N_1, N_2)$.

In some embodiments, a UE is configured with a CSI-RS resource comprising Q=MNP number of CSI-RS ports, wherein the CSI-RS resource is associated with MNP number of resource elements (REs) in a pair of PRBs in a subframe.

A UE is configured with a CSI-RS configuration via higher layer, configuring Q antenna ports—antenna ports A(1) through A(Q). The UE is further configured with CSI reporting configuration via higher layer in association with the CSI-RS configuration. The CSI reporting configuration includes information element (IE) indicating the CSI-RS decomposition information (or component PMI port configuration). The information element may comprise at least two integers, say $N_1$ and $N_2$, which respectively indicates a first number of antenna ports for a first dimension, and a second number of antenna ports for a second dimension, wherein $Q=N_1 \cdot N_2$.

When the UE is configured with $(N_1, N_2)$, the UE calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank)) is the (column-wise) Kronecker product of $W=W_1 \otimes W_2$. If PMI reporting is configured, the UE will report at least two component PMI corresponding to selected pair of $W_1$ and $W_2$.

In this disclosure, $[x_m]_{m=0, \ldots, M-1}$ refers to a vector of length M, and equals to $[x_m]_{m=0, \ldots, M-1} = [x_0, x_1, \ldots x_{M-1}]$. Also, $w^x$ implies the elementwise power to the x. For example, $w^x = [w_1 \ w_2]^x = [w_1^x \ w_2^x]$.

Figure 6:
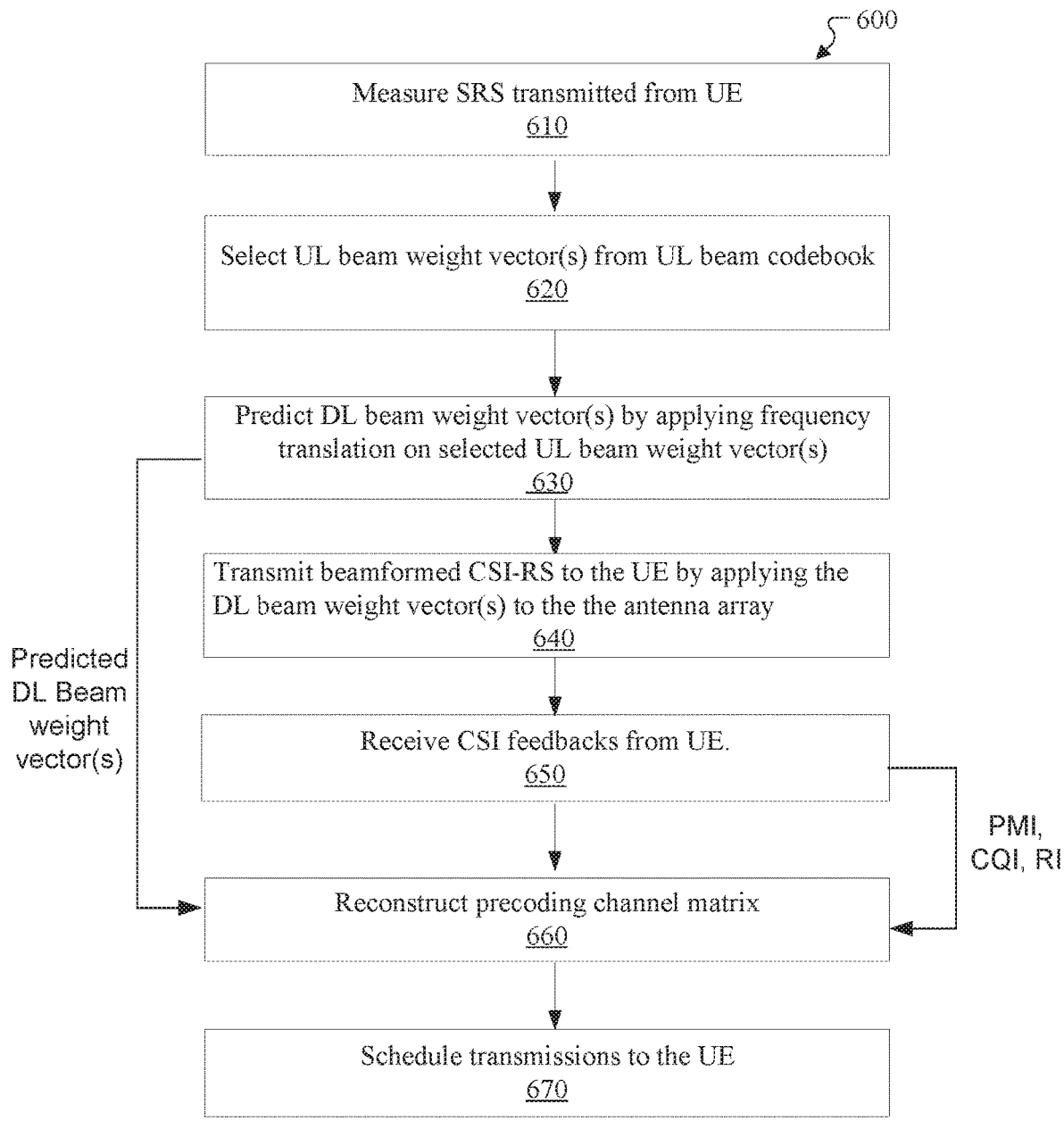
FIG. 6 illustrates an exemplary flowchart for the hybrid CSI acquisition and MU-MIMO precoding according to one embodiment of the present disclosure.

In some embodiments, the BS includes a uniform rectangular array (URA) with M vertical, and N horizontal TXRUs, with antenna spacing of $(d_V, d_H)$. The total number of TXRUs is denoted as $N_{TXRU}=MN$. The UL and DL wavelengths are denoted as: $\lambda_{UL}$ and $\lambda_{DL}$; and the corresponding center frequencies are: $f_{UL}$ and $f_{DL}$ FIG. 6 illustrates an exemplary flowchart for the hybrid CSI acquisition and MU-MIMO precoding according to one embodiment of the present disclosure. The embodiment of the method 600 shown in FIG. 6 is for illustration only. One or more of the components illustrated in FIG. 6 can be implemented in specialized processing circuitry configured to perform the noted functions or one or more of the components can be implemented by one or more processors executing instructions to perform the noted functions. Other embodiments are used without departing from the scope of the present disclosure.

The method 600 for the hybrid CSI acquisition and MU-MIMO precoding begins with step 610. In step 610, a base station (BS) configures and receives a sound reference signal (SRS) transmitted from UE, using at least one portion of the antenna array. In one embodiment, the BS can activate at lest one portion of the antenna array when receiving the SRS to generate one uplink (UL) beam vector.

In step 620, the BS selects at least one uplink (UL) beam vector based on an SRS measurement from a UL beam-codebook comprising a set of beam weight vectors, each of which can produce a UL beam.

In one embodiment, the UL beam weight vector can be a vertical UL beam weight vector or a horizontal UL beam weight vector. Alternatively, the UL beam weight vector includes a vertical UL beam weight vector and a horizontal UL beam weight vector.

In another embodiment, the UL beam weight vector can be denoted as $w^{UL}=w_H^{UL} \otimes w_V^{UL}$, where $\otimes$ denotes Kronecker product. In cases where the beam weight vectors steer the beam into a pair of azimuth and elevation angles ($\phi$, $\theta$), the UL beam weights can be denoted as $w^{UL}=w_H^{UL}(\phi) \otimes w_x^{UL}(\theta)$ In one method, the beam weight vectors for azimuth and elevation dimensions are oversampled DFT vectors which can steer the beam to azimuth angle $\phi$ and elevation angle $\theta$.

$$w_V^{UL}(\theta) = \left[\frac{1}{\sqrt{N_{TXRU}}}\exp\left(-\frac{j2\pi m d_V \cos(90°+\theta)}{\lambda_{UL}}\right)\right]_{m=0,\ldots,M-1} ; \text{and} \quad (1)$$

$$w_H^{UL}(\phi) = \left[\frac{1}{\sqrt{N_{TXRU}}}\exp\left(-\frac{j2\pi n d_H \sin(\phi)}{\lambda_{UL}}\right)\right]_{n=0,\ldots,N-1} ;$$

or alternatively $$w_H^{UL}(\phi) = \left[\frac{1}{\sqrt{N_{TXRU}}}\exp\left(-\frac{j2\pi n d_H \sin(90°+\theta)\sin(\phi)}{\lambda_{UL}}\right)\right]_{n=0,\ldots,N-1}$$

In another method, the beam weight vectors for azimuth and elevation dimensions are oversampled DFT vectors constructed with oversampling factors of $O_M$ and $O_N$.

$$w_V^{UL} = \left\{\left[\frac{1}{\sqrt{N_{TXRU}}}\exp\left(-\frac{j2\pi m k_V}{O_M M}\right)\right]_{m=0,\ldots,M-1} \right. \quad (2)$$

$$\left. k_V \in \{0,1,\ldots,O_M M - 1\}\right\}; \text{and}$$

$$w_H^{UL} =$$

$$\left\{\left[\frac{1}{\sqrt{N_{TXRU}}}\exp\left(-\frac{j2\pi n k_H}{O_N N}\right)\right]_{n=0,\ldots,N-1} \bigg| k_H \in \{0,1,\ldots,O_N N - 1\}\right\}.$$

In another embodiment, the beam codebook is constructed with are oversampled DFT vectors constructed with oversampling factors of $O_M$ and $O_N$, and then converted to oversampled DFT vectors which can steer the beam to azimuth angle $\phi$ and elevation angle $\theta$, with applying codebook index to angle transformation:

Given codebook index $k_H$, the elevation angle $\phi$ can be derived with solving the following equation for $\phi$:

$$\frac{j2\pi n d_H \sin(\phi)}{\lambda_{UL}} = \frac{j2\pi n k_H}{O_N N} \rightarrow \frac{d_V \sin(\phi)}{\lambda_{UL}} = \frac{k_H}{O_N N} \rightarrow \phi = \sin^{-1}\frac{k_H \lambda_{UL}}{d_H O_N N} \quad (3)$$

Given codebook index $k_V$, the elevation angle $\theta$ can be derived with solving the following equation for $\theta$:

$$\frac{j2\pi m d_V \cos(90+\theta)}{\lambda_{UL}} = \quad (4)$$

$$\frac{j2\pi m k_V}{O_M M} \rightarrow \frac{d_V \cos(90+\theta)}{\lambda_{UL}} = \frac{k_V}{O_M M} \rightarrow \theta = \cos^{-1}\frac{k_V \lambda_{UL}}{d_V O_M M} - 90°$$

In step 630, the BS applies a frequency translation on a UL beam weight vector(s) corresponding to a UL beam(s) to predict a DL beam weight vector(s).

For example, if a vertical UL beam vector is selected in step 620, the BS applies the frequency translation on a vertical UL beam weight vector to predict a vertical DL beam weight vector. Also, if a horizontal UL beam vector is selected in step 620, the BS applies the frequency translation on a horizontal UL beam weight vector to predict a horizontal DL beam weight vector. In addition, if vertical and horizontal UL beam vectors are selected in step 620, the BS applies the frequency translations on the vertical and horizontal UL beam weight vectors to predict vertical and horizontal DL beam weight vectors, respectively.

Given an oversampled UL DFT vector $w^{UL}=w_H^{UL}(\phi) \otimes w_V^{UL}(\theta)$ which can steer the beam to azimuth angle $\phi$ and elevation angle $\theta$, the frequency translation can be applied to find a corresponding DL beam weight vector $w^{DL}=w_H^{DL}(\phi) \otimes w^{DL}(\theta)$.

The DL beam weight vector to be used for the CSI-RS in the DL carrier is determined by applying elementwise power to the ratio of the DL and UL center frequency values, i.e., $$\frac{f_{DL}}{f_{UL}}$$

and normalizing the component weight vectors so that the norm of $w^{DL}$ is one.

$$w_V^{DL}(\theta) = \frac{1}{\sqrt{N_{TXRU}}}\left(\sqrt{N_{TXRU}} w_V^{UL}(\theta)\right)^{\left(\frac{f_{DL}}{f_{UL}}\right)} = \quad (5)$$

$$\frac{1}{\sqrt{N_{TXRU}}}\left(\left[\exp\left(-\frac{j2\pi m d \cos(90+\theta)}{\lambda_{UL}}\right)\right]_{m=0,\ldots,M-1}\right)^{\left(\frac{f_{DL}}{f_{UL}}\right)}$$

$$w_H^{DL}(\phi) = \frac{1}{\sqrt{N_{TXRU}}}\left(\sqrt{N_{TXRU}} w_H^{UL}(\phi)\right)^{\left(\frac{f_{DL}}{f_{UL}}\right)} = \quad (6)$$

$$\frac{1}{\sqrt{N_{TXRU}}}\left(\left[\exp\left(-\frac{j2\pi m d \sin(\phi)}{\lambda_{UL}}\right)\right]_{n=0,\ldots,N-1}\right)^{\left(\frac{f_{DL}}{f_{UL}}\right)}$$

Given an oversampled UL DFT vector $w^{UL}=w_H^{UL}(k_H) \otimes w_V^{UL}(k_V)$, the frequency translation can be applied to find a corresponding DL beam weight vector $w^{DL}=w_H^{DL}(k_H) \otimes w_V^{DL}(k_V)$. The corresponding DL beam weight vector(s) corresponding to the UL beam weight vector(s) is determined by applying elementwise power to the ratio of the DL and UL center frequency values, i.e., $$\frac{f_{DL}}{f_{UL}}$$

and normalizing the component weight vectors so that the norm of $w^{DL}$ is one.

$$w_V^{DL}(\theta) = \frac{1}{\sqrt{N_{TXRU}}} (\sqrt{N_{TXRU}} w_V^{UL}(k_V))^{\left(\frac{f_{DL}}{f_{UL}}\right)} = \qquad (7)$$

$$\frac{1}{\sqrt{N_{TXRU}}} \left( \left[ \frac{1}{\sqrt{N_{TXRU}}} \exp\left(-\frac{j2\pi m k_V}{O_M M}\right) \right]_{m=0,\ldots,M-1} \right)^{\left(\frac{f_{DL}}{f_{UL}}\right)}$$

$$w_H^{DL}(\phi) = \frac{1}{\sqrt{N_{TXRU}}} (\sqrt{N_{TXRU}} w_H^{UL}(k_H))^{\left(\frac{f_{DL}}{f_{UL}}\right)} = \qquad (8)$$

$$\frac{1}{\sqrt{N_{TXRU}}} \left( \left[ \frac{1}{\sqrt{N_{TXRU}}} \exp\left(-\frac{j2\pi n k_H}{O_N N}\right) \right]_{n=0,\ldots,N-1} \right)^{\left(\frac{f_{DL}}{f_{UL}}\right)}$$

In step 640, the BS transmits beamformed CSI-RS to the UE, wherein the CSI-RS is transmitted on the antenna arrays by applying the DL beam weight vector(s) to the antenna array.

For example, if a vertical DL beam weight vector is predicted in step 630, the BS transmits a beamformed CSI-RS to the UE by applying the vertical DL beam weight vector to the antenna array. Also, if a horizontal DL beam weight vector is predicted in step 630, the BS transmits a beamformed CSI-RS to the UE by applying the horizontal DL beam weight vector to the antenna array. In addition, if vertical and horizontal DL beam weight vectors are predicted in step 630, the BS transmits a beamformed CSI-RS to the UE by applying the vertical and horizontal DL beam weight vectors to the antenna array.

In some embodiments, the beamforming weights for the CSI-RS are applied to both dimensions. For example, CSI-RS beams are constructed narrow in both azimuth or elevation dimensions.

The narrow CSI-RS beam along a dimension is constructed by applying beam weights over the antenna elements or TXRUs of the 2D antenna array/panel. The beam weights may be applied across all the TXRUs or antenna elements of the 2D antenna panel. In this case, the UL beam weight vector can be denoted as $w^{UL} = w_H^{UL} \otimes w_V^{UL}$; and the DL beam weight vector can be denoted as $w^{DL} = w_H^{DL} \otimes w_V^{DL}$ where $\otimes$ denotes Kronecker product.

In cases where the beam weight vectors steer the beam into a pair of azimuth and elevation angles ($\phi$, $\theta$), the UL and the DL beam weights can be denoted as $w^{UL} = w_H^{UL}(\phi) \otimes w_V^{UL}(\theta)$ and $w^{DL} = w_H^{DL}(\phi) \otimes w_V^{DL}(\theta)$, respectively.

In one method, the beam weight vectors for azimuth and elevation dimensions are oversampled DFT vectors which can steer the beam to azimuth angle $\phi$ and elevation angle $\theta$.

$$w_V^{UL}(\theta) = \left[ \frac{1}{\sqrt{N_{TXRU}}} \exp\left(-\frac{j2\pi m d_V \cos(90° + \theta)}{\lambda_{UL}}\right) \right]_{m=0,\ldots,M-1} ; \text{and} \qquad (9)$$

$$w_H^{UL}(\phi) = \left[ \frac{1}{\sqrt{N_{TXRU}}} \exp\left(-\frac{j2\pi n d_H \sin(\phi)}{\lambda_{UL}}\right) \right]_{n=0,\ldots,N-1} ;$$

or alternatively $$w_H^{UL}(\phi) = \left[ \frac{1}{\sqrt{N_{TXRU}}} \exp\left(-\frac{j2\pi n d_H \sin(90° + \theta)\sin(\phi)}{\lambda_{UL}}\right) \right]_{n=0,\ldots,N-1}$$

In another method, the beam weight vectors for azimuth and elevation dimensions are oversampled DFT vectors constructed with oversampling factors of $O_M$ and $O_N$.

$$w_V^{UL} = \left\{ \left[ \frac{1}{\sqrt{N_{TXRU}}} \exp\left(-\frac{j2\pi m k_V}{O_M M}\right) \right]_{m=0,\ldots,M-1} \right. \qquad (10)$$

$$\left. k_V \in \{0, 1, \ldots, O_M M - 1\} \right\}; \text{and}$$

$$w_H^{UL} = \left\{ \left[ \frac{1}{\sqrt{N_{TXRU}}} \exp\left(-\frac{j2\pi n k_H}{O_N N}\right) \right]_{n=0,\ldots,N-1} \right.$$

$$\left. k_H \in \{0, 1, \ldots, O_N N - 1\} \right\}.$$

In some embodiments, the beamforming weights for the CSI-RS are applied to a single dimension. For example, CSI-RS beams are constructed narrow in either azimuth or elevation dimension, wide in the other dimension.

The narrow CSI-RS beam along a dimension is constructed by applying beam weights across the antenna elements or TXRUs comprising each column or each row of the 2D antenna array. In one method, $w^{UL} = w_H^{UL}(\phi)$ to steer the beam to an azimuth angle $\phi$); in another method, $w^{UL} = w_V^{UL}(\theta)$ to steer the beam to an elevation angle $\theta$. The frequency translation to the DL vectors can be similarly conducted similarly as the above 2D steering case.

The DL beam weight vector is used for the CSI-RS in the DL carrier. DL beam weight vector $w^{DL} = w_H^{DL}(\phi) \otimes w_V^{DL}(\theta)$.

In step 650, the UE receives a beamformed CSI-RS from the BS. Based on beamformed CSI-RS, the UE derives CSI feedbacks from, for example, a codebook and provides the CSI feedbacks to the BS. The CSI feedbacks include a Precoding Matrix Index (PMI), a Channel Quality Indication (CQI) and a rank indicator (RI). For this operation, the UE may have been configured with, for example, the transmission mode 9.

For example, if a beamformed CSI-RS was produced with the vertical DL beam weight vector in step 640, the PMI includes indications on a horizontal DL beam vector and a co-phase value. Also, if a beamformed CSI-RS was produced with a horizontal DL beam vector in step 640, the PMI includes indications on a vertical DL beam vector and a co-phase value. In addition, if a beamformed CSI-RS was produced with vertical and horizontal DL beam vectors in step 640, the PMI includes an indication on a co-phase value.

In step 660, using the feedback CSI comprising PMI, CQI and RI together with the DL beam weight vector(s) predicted in step 630, the BS can identify a vertical DL beam vector, a horizontal DL beam vector, and a co-phase value. With these two beam vectors and one co-phase value, the BS reconstructs a precoder matrix for the UE. For example, the precoder matrix can be calculated as follows:

$$W = \frac{1}{p} \begin{bmatrix} w_H^\square \otimes w_V^\square \\ \phi_n w_H^\square \otimes w_V^\square \end{bmatrix}; \qquad (11)$$

wherein p is a normalization factor to make total transmission power 1, and $w_V$ is a vertical DL beam vector, $w_H$ is a horizontal DL beam vector, and a co-phase value.

In step 670, the BS performs scheduling, precoding and link adaptation operations, using the reconstructed precoding channel matrices for the UE.

In the 3 carrier aggregation (3CA) system, SRS is only available at one carrier frequency called primary cell (Pcell) while the other two carrier frequencies only have UE feedback available and called secondary cells (Scell). SRS can be used to find CSI at Pcell. For the 3CA system, the disclosure provides the three options below for construction CSI at Scell where UE feedback only is available. Let $H_{srs} \in C^{N_{TxRU}*\#SCs}$ be the received SRS at Pcell at all available subcarriers (SCs) for all TXRUs of the BS. The CSI at Scell can be constructed using one of three methods.

The first option utilizes wideband (WB) version of $H_{srs}$ which is denoted by $h_{srs}^{WB}$ as WB CSI for Scell. In this option, $h_{srs}^{WB}$ is the dominant eigen vector of the empirical covariance of the columns of $H_{srs}=[h_{srs}^1, h_{srs}^2, \ldots, h_{srs}^{\#SCs}]$ where empirical conariance matrix is denoted by $H_{srs}^{cov}$. Specifically, $$H_{srs}^{cov} = \Sigma_{i=1}^{\#SCs}[h_{srs}^i * (h_{srs}^i)^*]$$

and $$h_{srs}^{WB} = v_1(H_{srs}^{cov}) \quad (12)$$

where $v_1(.)$ represents the most dominant eigen vector of the matrix it operates on.

The second option utilizes $h_{srs}^{WB}$ derived in the first option, but the second option applies subband PMI feedback from each UE to construct subband CSI to be used in Scell. We denote subband CSI used in Scell by $H_{srs}^{SB} = [H_{srs}^{SB,1}, H_{srs}^{SB,2}, \ldots, H_{srs}^{SB,\#RBGs}] \in C^{N_{TXRU}*\#RBGs}$ where feedback reporting may occur at each resource block group (RBG). If PMI feedback (containing only cophase information) for this UE is $P=[p_1, p_2, \ldots p_{\#RBG}] \in C^{2*\#RBGs}$, then $$h_{srs}^{SB,i} = \begin{bmatrix} p_i(1) * h_{srs}^{WB}\left(1: \frac{N_{TXRU}}{2}\right) \\ p_i(2) * h_{srs}^{WB}\left(\frac{N_{TXRU}}{2}+1: N_{TXRU}\right) \end{bmatrix} \quad (13)$$

As the third option, if UE is configured as the transmission mode 9 (TM9), a method similar to hybrid precoding can be used. Using precoded CSI-RS, the third option is able to get both the direction of the horizontal channel and the cophase information from each UE. Vertical channel can be obtained using dominant Eigenvector of the empirical covariance of vertical SRS signals across available subcarriers using all columns of the BS. Empirical covariance is calculated as done in method 1 using only vertical channels (i.e., $h_{srs}^i(1:M), h_{srs}^i(M+1:2M), \ldots, h_{srs}^i(MN-M+1:MN))$. In particular $$H_{srs}^{cov} = \sum_{k=1}^{2N} \sum_{i=1}^{\#SCs}\left[h_{srs}^i\left(\frac{M}{2}(k-1)+1: \frac{M}{2}k\right) * \left(h_{srs}^i\left(\frac{M}{2}(k-1)+1: \frac{M}{2}k\right)\right)^*\right] \quad (14)$$

Then, the vertical direction of the channel is calculated to be $$h_{vertical}^{WB} = v_1(H_{srs}^{cov}) \quad (15)$$

Following that, the CSI can be constructed exactly as in hybrid precoding method.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A base station (BS) comprising:
    a transceiver comprising an antenna array, the transceiver configured to measure a sound reference signal (SRS) from a user equipment (UE), using at least one portion of the antenna array; and
    at least one processor configured to:
        select at least one uplink (UL) beam vector, based on the SRS measurement, from a UL beam-codebook comprising a set of beam weight vectors;
        determine at least one downlink (DL) beam vector corresponding to each of the selected at least one UL beam vector;
        transmit a beamformed channel state information (CSI)-reference signal (RS) by applying the at least one DL beam vector to the antenna array;
        receive a CSI feedback including a Precoding Matrix Index (PMI) from the UE, wherein the PMI is determined based on the beamformed CSI-RS; and
        construct a precoding channel matrix for the UE based on the PMI and the at least one DL beam vector.

2. The BS of claim 1, wherein the CSI feedback is derived based on the beamformed CSI-RS and is provided to the UE in a transmission mode 9.

3. The BS of claim 1, wherein:
    the at least one UL beam vector comprises one of a vertical UL beam vector, a horizontal UL beam vector, or a vertical UL beam vector and a horizontal UL beam vector, and
    the at least one DL beam vector comprises one of a vertical DL beam vector, a horizontal DL beam vector, or a vertical DL beam vector and a horizontal DL beam vector.

4. The BS of claim 1, wherein if the determined at least one DL beam vector is a vertical DL beam vector, the PMI includes indications on a horizontal DL beam vector and a co-phase value.

5. The BS of claim 1, wherein if the determined at least one DL beam vector is a horizontal DL beam vector, the PMI includes indications on a vertical DL beam vector and a co-phase value.

6. The BS of claim 1, wherein if the determined at least one DL beam vector is a vertical DL beam vector and a horizontal DL beam vector, the PMI includes an indication on a co-phase value.

7. The BS of claim 1, wherein the at least one processor is further configured to conduct a frequency translation on each of the selected at least one UL beam vector to determine the at least one downlink (DL) beam vector applying elementwise power to a ratio of DL and UL center frequency values.

8. A method for beamforming in a base station (BS), the method comprising:

measuring a sound reference signal (SRS) from a user equipment (UE), using at least one portion of an antenna array;

selecting at least one uplink (UL) beam vector, based on the SRS measurement, from a UL beam-codebook comprising a set of beam weight vectors;

determining at least one downlink (DL) beam vector corresponding to each of the selected at least one UL beam vector;

transmitting a beamformed channel state information (CSI)-reference signal (RS) by applying the at least one DL beam vector to the antenna array;

receiving a CSI feedback including a Precoding Matrix Index (PMI) from the UE, wherein the PMI is determined based on the beamformed CSI-RS; and constructing a precoding channel matrix for the UE, based on the PMI and the at least one DL beam vector.

9. The method of claim 8, wherein the CSI feedback is derived based on the beamformed CSI-RS and is provided to the BS in a transmission mode 9.

10. The method of claim 8, wherein the at least one UL beam vector comprises one of a vertical UL beam vector, a horizontal UL beam vector, or a vertical UL beam vector and a horizontal UL beam vector, and the at least one DL beam vector comprises one of a vertical DL beam vector, a horizontal DL beam vector, or a vertical DL beam vector and a horizontal DL beam vector.

11. The method of claim 8, wherein if the determined at least one DL beam vector is a vertical DL beam vector, the PMI includes indications on a horizontal DL beam vector and a co-phase value.

12. The method of claim 8, wherein if the determined at least one DL beam vector is a horizontal DL beam vector, the PMI includes indications on a vertical DL beam vector and a co-phase value.

13. The method of claim 8, wherein if the determined at least one DL beam vector comprises a vertical DL beam vector and a horizontal DL beam vector, the PMI includes an indication on a co-phase value.

14. The method of claim 8, the method further comprising:

conducting a frequency translation on each of the selected at least one UL beam vector to determine the at least one downlink (DL) beam vector applying elementwise power to a ratio of DL and UL center frequency values.

15. A non-transitory computer-readable medium comprising program code for beamforming in a wireless communication in a base station (BS), wherein the program code that, when executed by a processor, causes the processor to:

measure a sound reference signal (SRS) from a user equipment (UE), using at least one portion of an antenna array;

select at least one uplink (UL) beam vector, based on the SRS measurement, from a UL beam-codebook comprising a set of beam weight vectors;

determine at least one downlink (DL) beam vector corresponding to each of the selected at least one UL beam vector;

transmit a beamformed channel state information (CSI)-reference symbol (RS) by applying the at least one DL beam vector to the antenna array;

receive a CSI feedback including a Precoding Matrix Index (PMI) from the UE, wherein the PMI is determined based on the beamformed CSI-RS; and construct a precoding channel matrix for the UE, based on the PMI and the at least one DL beam vector.

16. The non-transitory computer-readable medium of claim 15, wherein the CSI feedback is derived based on the beamformed CSI-RS and is provided to the BS in a transmission mode 9.

17. The non-transitory computer-readable medium of claim 15, wherein the at least one UL beam vector comprises one of a vertical UL beam vector, a horizontal UL beam vector, or a vertical UL beam vector and a horizontal UL beam vector, and the at least one DL beam vector comprises one of a vertical DL beam vector, a horizontal DL beam vector, or a vertical DL beam vector and a horizontal DL beam vector.

18. The non-transitory computer-readable medium of claim 15, wherein if the determined at least one DL beam vector is a vertical DL beam vector, the PMI includes indications on a horizontal DL beam vector and a co-phase value, and wherein if the determined at least one DL beam vector is a horizontal DL beam vector, the PMI includes indications on a vertical DL beam vector and a co-phase value.

19. The non-transitory computer-readable medium of claim 15, wherein if the determined at least one DL beam vector comprises a vertical DL beam vector and a horizontal DL beam vector, the PMI includes an indication on a co-phase value.

20. The non-transitory computer-readable medium of claim 15, further comprising program code that, when executed by the processor, causes the processor to:

conduct a frequency translation on each of the selected at least one UL beam vector to determine the at least one downlink (DL) beam vector applying elementwise power to a ratio of DL and UL center frequency values.

* * * * *